United States Patent [19]
Hase et al.

[11] Patent Number: 5,442,966
[45] Date of Patent: Aug. 22, 1995

[54] TORQUE SENSOR

[75] Inventors: Hiroyuki Hase; Rihito Shoji, both of Kyoto; Masayuki Wakamiya, Osaka, all of Japan

[73] Assignee: Matsushita Electric Industrial Co., Ltd., Osaka, Japan

[21] Appl. No.: 231,944

[22] Filed: Apr. 21, 1994

Related U.S. Application Data

[63] Continuation of Ser. No. 845,982, Mar. 4, 1992, abandoned.

[30] Foreign Application Priority Data

Mar. 4, 1991 [JP] Japan .................................. 3-037206

[51] Int. Cl.⁶ ............................................. G01L 1/00
[52] U.S. Cl. ............................ 73/862.335; 73/862.333
[58] Field of Search ................. 73/862.333, 862.334, 73/862.335, 862.336, 862.69, DIG. 2; 324/209

[56] References Cited

U.S. PATENT DOCUMENTS 4,823,617  4/1989  Hase et al. .
4,887,461  12/1989  Sugimoto et al. .
4,907,462  3/1990  Okama et al. .................. 73/862.335

FOREIGN PATENT DOCUMENTS 0366217  5/1990  European Pat. Off. .
3940220  6/1990  Germany .
59-77326  5/1984  Japan .
979909  11/1983  U.S.S.R. .

OTHER PUBLICATIONS

European Search Report dated Sep. 29, 1993 (Berlin).

Primary Examiner—Richard E. Chilcot, Jr.
Assistant Examiner—R. Ziegel
Attorney, Agent, or Firm—Lowe, Price, LeBlanc & Becker

[57] ABSTRACT

A torque sensor of the type utilizing magnetostriction of either a shaft made of a magnetostrictive magnetic alloy, or a magnetostrictive magnetic alloy layer formed on an outer peripheral surface of a shaft is disclosed, in which coils are disposed around the shaft for detecting a magnetic property of the magnetostrictive magnetic alloy, a tubular magnetic yoke made of a magnetic alloy having a soft magnetic property and disposed around the coils for excluding the influence of a disturbance magnetic field and completing a closed magnetic circuit, and a hollow cylindrical container disposed around the magnetic yoke. The torque sensor thus constructed has a high measuring accuracy and an excellent thermal stability.

24 Claims, 5 Drawing Sheets

TORQUE SENSOR

This application is a continuation of application Ser. No. 07/845,982 filed Mar. 4, 1992, now abandoned.

BACKGROUND OF THE INVENTION

1. Field of the Invention

The present invention relates to a torque sensor for magnetically detecting a torque transmitted to a rotating shaft without direct contact with the rotating shaft.

2. Description of the Prior Art

Conventional torque sensors of the type utilizing magnetostriction are classified into two groups. A first group of torque sensors include a rotating shaft made of a magnetic alloy, such as a ferro-alloy, having a magnetostrictive property, and a second group of torque sensors include a rotating shaft having on its outer peripheral surface a magnetic alloy layer having a soft magnetic property and magnetostrictive property. In either group of conventional torque sensors, the magnetostrictive magnetic alloy is magnetically anisotropic in different directions slanting at angles of $+45°$ and $-45°$, respectively, with respect to a longitudinal axis of the shaft. Two coils are disposed around the magnetostrictive magnetic alloy for detecting a magnetic property of the magnetostrictive magnetic alloy. The coils are received end to end within a tubular container which is made of an alloy of soft magnetic property and provided for purposes of excluding the influence of a disturbance magnetic field and completing a closed magnetic circuit. The tubular container is hereinafter referred to as "magnetic yoke".

With this construction, when a torque is transmitted to the rotating shaft of the torque sensor, an outer peripheral surface of the shaft is strained or otherwise deformed. In this instance, if the torque exerted on the shaft is clockwise, a portion of the magnetostrictive magnetic alloy which is magnetically anisotropic in the direction of $+45°$ increases its magnetic permeability, while a portion of the magnetostrictive magnetic ally which is magnetically anisotropic in the direction of $-45°$ decreases its magnetic permeability. This relation in magnetic permeability is reversed when the torque exerted on the shaft is counterclockwise. Changes in magnetic permeability of the magnetostrictive magnetic alloy are detected in terms of changes in self-inductance of the two coils, and the difference in self-inductance between the two coils is measured by a differential detector whereby the direction and magnitude of the torque can be detected (see, Japanese Patent Laid-open Publication No. 59-77326). The two coils have the same inductance so that in a theoretical sense, no differential output is produced from the torque sensor when a torque is not exerted on the shaft. However, when the magnetic yoke is secured by screws to a structure for attaching the torque sensor to the structure, the torque sensor produces an apparent differential output due to tightening forces applied to the magnetic yoke. In addition, when the environmental temperature changes, a stress is created due to a difference in thermal expansion coefficient between the structure and the magnetic yoke. The stress thus created results in generation of an apparent differential output from the torque sensor.

It has been proved that the apparent differential output is caused by magnetostriction of the magnetic yoke. It is obvious that the apparent differential output can be reduced by using a magnetic yoke which is made of a soft magnetic property material, such as 78% Ni—Mo—Cu—Fe alloy, having a small magnetostrictive property. However, such a material is expensive and, hence, the torque sensor is costly to manufacture.

SUMMARY OF THE INVENTION

With the foregoing drawbacks of the prior art in view, it is an object of the present invention to provide a torque sensor having structural features which substantially eliminate generation of an apparent differential output caused by stresses created in a magnetic yoke when the torque sensor is attached to a structure and, hence, guarantee a highly accurate measurement of torque, and further enable production of the torque sensor at a low cost.

According to the present invention, there is provided a torque sensor which comprises: a shaft for transmitting a torque exerted thereon, at least an outer peripheral surface of the shaft being made of a magnetic alloy having a magnetostrictive property; coil means disposed around the outer peripheral surface of the shaft with a space therebetween for detecting a magnetic property of the magnetostrictive magnetic alloy; a tubular magnetic yoke disposed around the coil means for forming a magnetic circuit between itself and the magnetostrictive magnetic alloy; a hollow cylindrical container disposed around the magnetic yoke for containing the same; and electric means operatively connected with the coil means for detecting for detecting a change in magnetic permeability of the magnetostrictive magnetic alloy in terms of a change in impedance of the coil means caused by the torque exerted on the shaft, thereby determining the torque.

A torque sensor may further include a stress absorbing means acting between the container and the magnetic yoke for absorbing stresses to prevent magnetostriction of the magnetic yoke which might change magnetic characteristics of the torque sensor. The stress absorbing means may be a tubular cushioning sleeve made from a synthetic resin and bonded to the container and the magnetic yoke, a clearance defined between the container and the magnetic yoke as a result of loose-fitting engagement between the container and the magnetic yoke, or a tubular thin film of synthetic resin filled in a clearance defined between the container and the magnetic yoke as a result of a loose-fit between the container and the magnetic yoke.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE INVENTION

The present invention will be described hereinbelow in greater detail with reference to certain preferred embodiments illustrated in the accompanying drawings.

Figure 1:
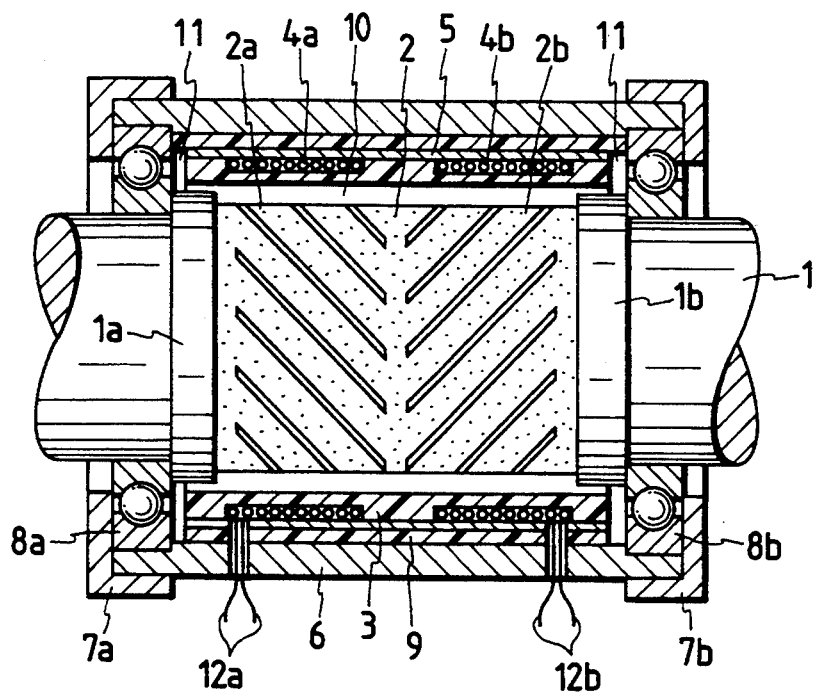
FIG. 1 is a diagrammatical front elevational view, with parts cutaway for clarity, of a torque sensor according to a first embodiment of this invention.
Figure 2:
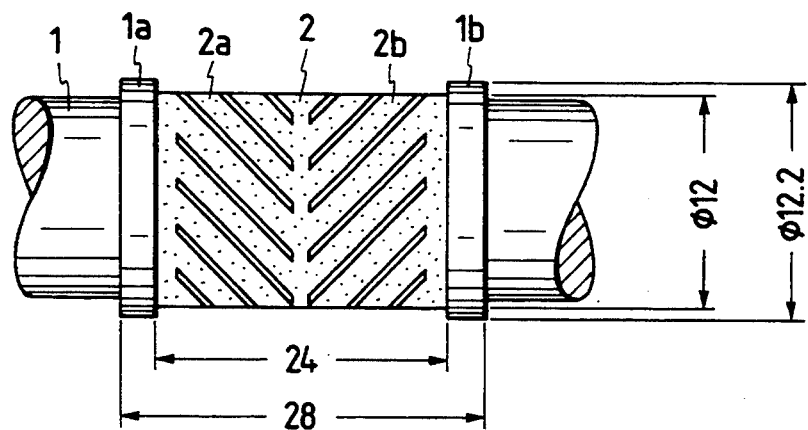
FIG. 2 is a front elevational view showing dimensions of a shaft portion of the torque sensor.
Figure 3:
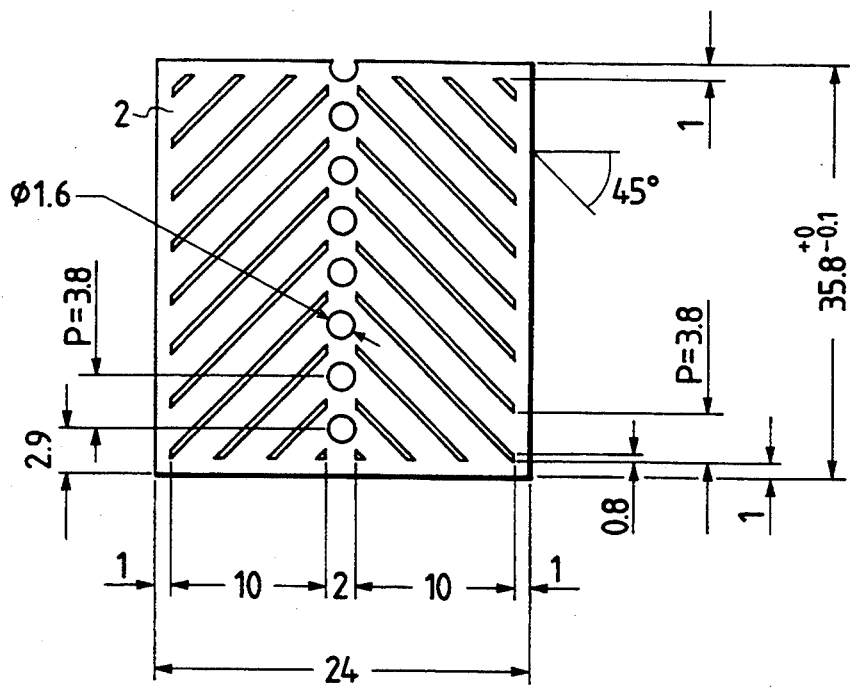
FIG. 3 is a plan view showing an amorphous magnetic alloy film formed by etching.

FIG. 1 shows the general construction of a torque sensor according to a first embodiment of this invention. The torque sensor includes a shaft 1 made of titanium and having a diameter of 12 mm. The titanium shaft 1 has a coefficient of thermal expansion of $9.4 \times 10^{-6}(1/^\circ C)$. Actual dimensions of the shaft 1 is shown in FIG. 2. The shaft 1 has a pair of longitudinally spaced annular flanges 1a and 1b for positioning a pair of ball bearings 8a, 8b and an amorphous magnetic alloy film 2. The amorphous magnetic alloy film 2 is disposed between the annular flanges 1a, 1b and attached by bonding to an outer peripheral surface of the shaft 1. The amorphous magnetic alloy film 2 thus bonded forms a surface magnetic layer. To form the surface magnetic layer, an amorphous magnetic alloy film shown in FIG. 3 is fabricated by etching. The amorphous magnetic alloy film strip is then rolled into a tubular form having the same radius of curvature as an outer peripheral surface of the shaft 1, and finally bonded to the outer peripheral surface of the shaft 1. The bonding is performed at a temperature ranging from 200° to 250° C. using an adhesive composed of bismaleimidetriazine resin sold under the tradename BT2164 manufactured by Mitsubishi Gas Chemical Company. The thickness of the adhesive is in the range of about 20–60 μm. The amorphous magnetic alloy film 2 is an Fe—Cr—Si—B alloy, has a coefficient of linear thermal expansion of $7.8 \times 10^{-6}6(1/^\circ C.)$ and a saturation magnetostriction constant of $20 \times 10^{-6}$ and is 25 μm in thickness. As shown in FIG. 1, the amorphous magnetic alloy film 2 has two juxtaposed, symmetrical helical patterns 2a and 2b. The first helical pattern 2a has a pitch angle of +45° with respect to a longitudinal axis of the shaft 1, while the second helical pattern 2b has a pitch angle of −45° with respect to the longitudinal axis of the shaft 1.

A tubular bobbin 3 molded of synthetic resin is disposed concentrically around the amorphous magnetic alloy film 4 with a space or air gap 10 defined therebetween. The bobbin 3 has, in its outer peripheral surface, two circumferential grooves having a depth of about 0.6 mm. The grooves extend over and around the first and second helical patterns 2a, 2b, respectively, and receive therein first and second coils 4a and 4b, respectively. Each of the coils 4a, 4b is formed from a copper wire having a diameter of about 0.1 mm and wound on the bobbin 3 into three layers each having 40 turns. Thus, each coil 4a, 4b has 160 turns and extends over and around a corresponding one of the helical patterns 2a, 2b of the amorphous magnetic alloy film 4.

A tubular magnetic yoke 5 made of 45% Ni—Fe alloy steel is firmly fitted over the bobbin 3 to hold the coils 4a, 4b within the circumferential grooves of the bobbin 3. The tubular magnetic yoke 5 is fitted in a tubular cushioning sleeve 9. The cushioning sleeve 9 is made from Duracon ("Duracon" is the trademark for a certain acetal resin manufactured by Polyplastic Corporation) and serves as a stress absorbing means. A hollow cylindrical holder or container 6 made of stainless alloy is fitted over the cushioning sleeve 9. The cushioning sleeve 9 is secured by bonding to the magnetic yoke 5 and the container 6. A pair of end caps 7a and 7b is attached to opposite ends of the hollow cylindrical container 6 to retain the ball bearings 8a, 8b within bearing holes formed at the opposite end of the container 6. Thus, the container 6 is rotatably mounted on the shaft i via the ball bearings 8a, 8b. The bobbin 3, cushioning sleeve 9 and magnetic yoke 5 have a length smaller than the distance between the ball bearings 8a, 8b and they are disposed centrally between the ball bearings 8a, 8b, with a space 11 defined between each of the bearings 8a, 8b and a corresponding one of opposite ends of the bobbin 3, cushioning sleeve 9 and magnetic yoke 5. The spaces 11 thus provided preclude the generation of stresses acting in the longitudinal direction of the shaft due to the difference in thermal expansion coefficient between the container 6, the magnetic yoke 5 and the shaft 1 when the temperature changes. Opposite ends 12a, 12b of each coil 4a, 4b are led out from the bobbin 3 through three aligned holes 13a, 13b extending through the magnetic yoke 5, cushioning sleeve 9 and container 6, respectively.

Figure 4:
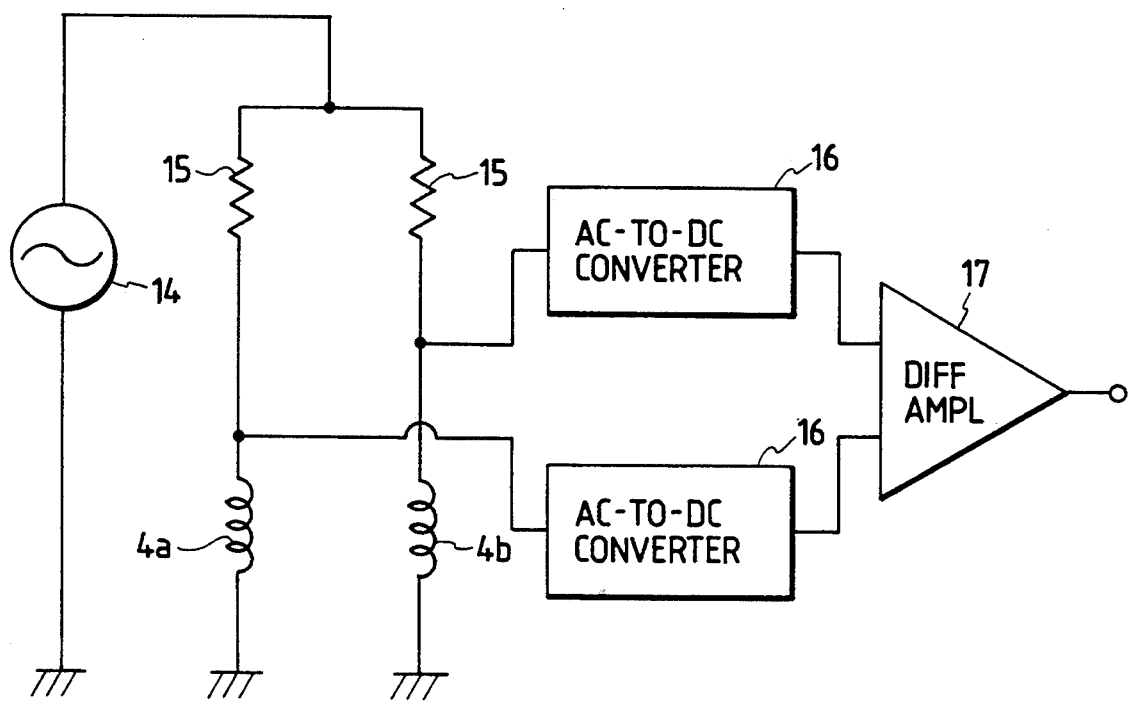
FIG. 4 is a circuit diagram of a detecting circuit.

The coil ends 12a, 12b are connected to a detecting circuit shown in FIG. 4. The detecting circuit includes a sine-wave oscillator 14 operating at a frequency of 16 kHz, two resistances 15 and 15 each connected in series to one of the coils 4a, 4b so as to form a bridge circuit, two ac to dc converters 16 and 16 which hold the peak ac voltage appearing across each respective coil 4a, 4b and convert the ac voltage into dc voltage, and a differential amplifier 17 connected to the ac to dc converters 16, 16 for producing a torque sensor output which is proportional to the difference between the voltages applied to its two inputs from the respective converters 9, 9. The detecting circuit of the foregoing construction is used to evaluate characteristics of the torque sensor.

Figure 5:
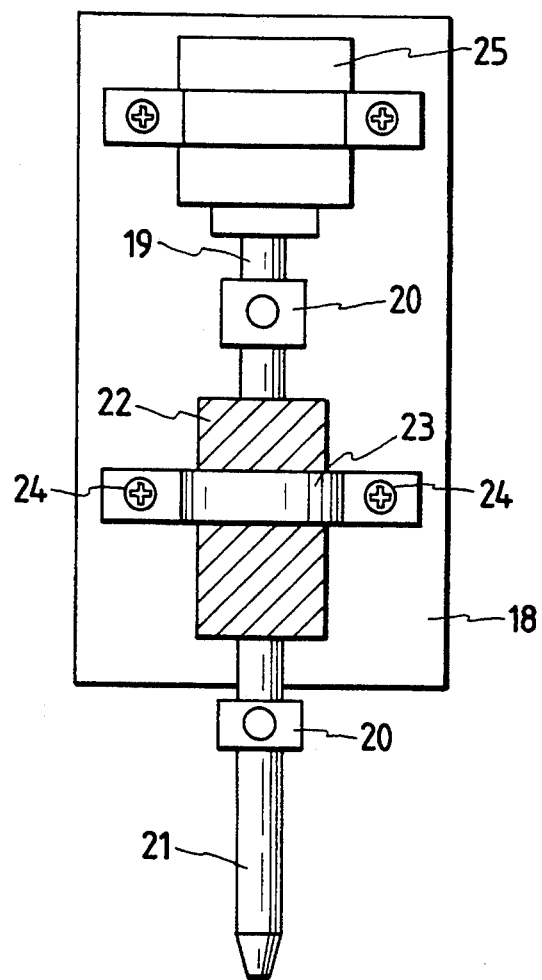
FIG. 5 is a schematic plan view illustrative of the manner in which the torque sensor is attached to a base of a structural member.
Figure 6:
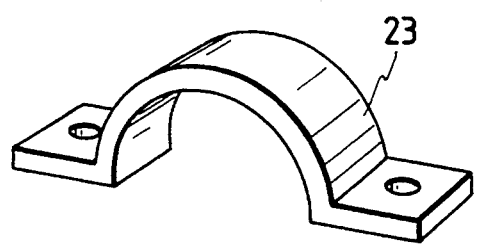
FIG. 6 is a clamp band for clamping the torque sensor to the base.

FIG. 5 shows one form of application of the torque sensor of the first embodiment described above, in which the torque sensor 22 (indicated by hatching for clarity) is attached to a body of a screw-tightening robot. In FIG. 5, numeral 18 is a base of the robot body, 19 is a shaft of a drive motor 25 connected via a universal joint 20 to the shaft 1 (FIG. 1) of the torque sensor 22, 21 is a driver bit 21 connected via another universal joint 20 to the shaft 1 of the torque sensor 22, and 23 is a metallic clamp band secured at opposite ends to the base 18 by means of a pair of screws 24, 24 for attaching the torque sensor 22 to the base 18. The clamp band 23 extends around substantially a central portion of the torque sensor 22 and hence tights the central portion.

Figure 7:
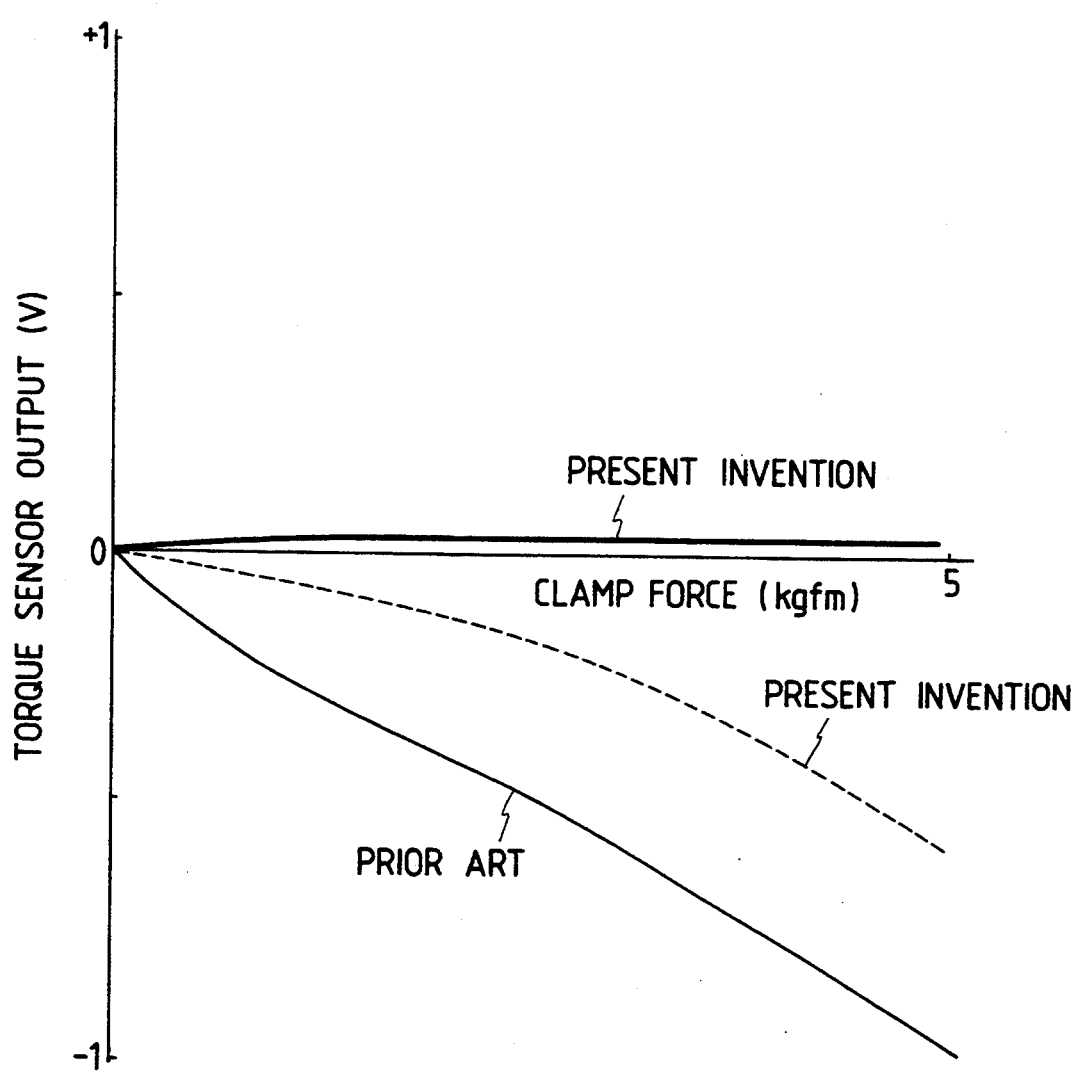
FIG. 7 is a graph showing the relationship between the output of the torque sensor and the clamping force exerted on the torque sensor when the torque sensor is attached to the base by the clamp band.

FIG. 7 is a graph showing the relationship between the clamping force exerted on a torque sensor and the differential output of the torque sensor measured when the torque sensor is attached to the base 18 by means of the clamp band 23 in the manner as shown in FIG. 5. During the measurement, no torque is exerted on the shaft of the torque sensor, and the detecting circuit shown in FIG. 4 is used for measuring the differential output of the torque sensor. The axis of abscissas of the graph represents the clamp force (kgfm) exerted on the torque sensor, and the axis of ordinates represents the differential output of the torque sensor. In FIG. 7, the thick solid line is the differential output-clamp force curve of the torque sensor 22 of the first embodiment described above, the broken line is the differential output-clamp force curve of a modified torque sensor which differs from the torque sensor 22 in that the magnetic yoke 5 is directly press-fitted with the container 6 without the intervention of the Duracon cushioning sleeve 9, and the thin solid line is the differential output-clamp force curve of a conventional torque sensor having a magnetic yoke and devoid of the container 6.

As evidenced from FIG. 7, the differential output drift of the torque sensor 22 is stable and substantially constant and does not produce an apparent differential output even when a large clamp force is applied to the torque sensor 22. In the case of the conventional torque sensor, zero drift increases as the exerted clamp force is increased. The modified torque sensor produces an apparent differential output to some extent due to press-fitting connection between the magnetic yoke 5 and the container 6. It is obvious from the foregoing results that the plastic cushioning sleeve 9 absorbs stresses and thereby prevents the magnetic yoke 6 from undergoing magnetostriction which will bring about a change in magnetic characteristic of the torque sensor.

It has been found that when the conventional torque sensor while being attached to the base 18 is subjected to a temperature change, zero drift is produced due to a change in clamp force caused by the difference in thermal expansion coefficient between the clamp band 23 and a body of the torque sensor. As against the conventional torque sensor, the torque sensor of the abovementioned first embodiment is free from zero drift even when the environmental temperature changes.

The material used for forming the cushioning sleeve 9 is not limited to Duracon (acetal resin) but may be epoxy resin, bismaleimidetriazine resin, Teflon ("Teflon" is the trademark for certain fluorocarbon resins manufactured by Du Pont) or a material which is softer than metal. The synthetic resin cushioning sleeve preferably has a thickness in excess of 0.05 mm. It is expected however that the same effect can be attained even when the thickness of the cushioning sleeve 9 is less than 0.05 mm.

Figure 8:
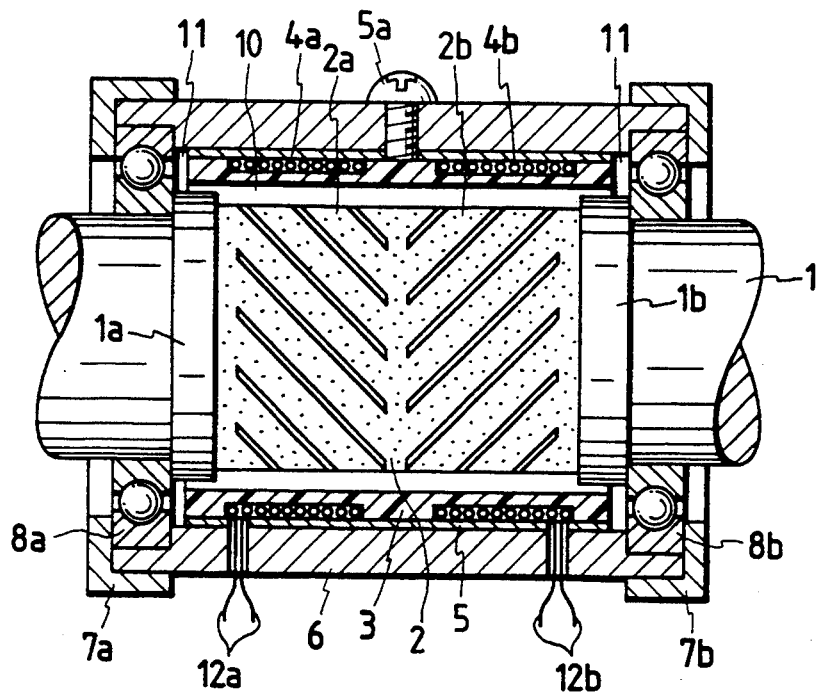
FIG. 8 is a view similar to FIG. 1, but showing the construction of a torque sensor according to a second embodiment of this invention.

FIG. 8 shows the general construction of a torque sensor according to a second embodiment of this invention. These parts which are identical or corresponding to those of the first embodiment shown in FIG. 1 are designated by identical or corresponding reference characters, and a further description can be omitted.

Figure 9:
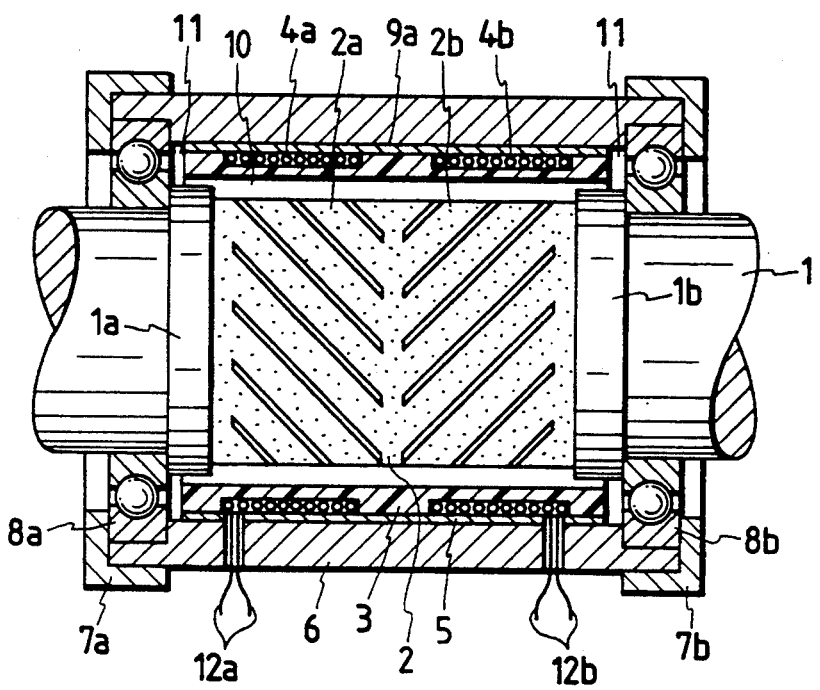
FIG. 9 is a view similar to FIG. 8, but showing a modification of the torque sensor.

The torque sensor of the second embodiment differs from the torque sensor of the first embodiment in that the hollow cylindrical container 6 and the tubular magnetic yoke 5 are loose-fitted with each other so as to jointly forming a stress absorbing means. The fit tolerance of the loose-fitting is 50 μm. The container 6 and the magnetic yoke 5 are joined at their longitudinal central portion by a screw 5a. With this construction, zero drift does not occur as in the case of the first embodiment. Instead of using the screw 5a, a synthetic resin such as epoxy resin is used to fill a clearance between the container 6 and the magnetic yoke 5 so that the container 6 and the magnetic yoke 5 are joined together via a tubular thin film 9a of synthetic resin, as shown in FIG. 9. The epoxy resin thus filled forms a cushion absorbing means.

Eligible materials for the magnetic yoke 5 may include a amorphous magnetic alloy film rolled into a tubular form, a rolled silicon steel plate of 0.1 mm thick, or a ferrite tube. When the magnetic yoke 5 is composed of a ferrite tube, the use of the container 6 is preferable in order to protect the ferrite tube against damage.

Obviously, various minor changes and modifications of the present invention are possible in the light of the above teaching. It is therefore to be understood that within the scope of the appended claims the invention may be practiced otherwise than as specifically described.

What is claimed is:

1. A torque sensor comprising:
   a shaft for transmitting a torque exerted thereon, at least an outer peripheral surface of said shaft being made of a magnetic alloy having a magnetostrictive property;
   coil means disposed around said outer peripheral surface of said shaft for detecting a magnetic property of said magnetostrictive magnetic alloy;
   a tubular magnetic yoke disposed around said coil means for forming a magnetic circuit between itself and said magnetostrictive magnetic alloy;
   a hollow cylindrical container disposed around said magnetic yoke for containing the same, both end portions of said hollow cylindrical container being rotatably supported by bearings with gaps between the bearings and said tubular magnetic yoke;
   stepped portions formed on said shaft for supporting the bearings;
   a cushioning sleeve disposed between said tubular magnetic yoke and said hollow cylindrical container for absorption of stress created therebetween; and
   means operatively connected with said coil means for detecting a change in magnetic permeability of said magnetostrictive magnetic alloy in terms of a change in impedance of said coil means caused by the torque exerted on said shaft, thereby determining the torque.

2. A torque sensor according to claim 1, wherein said tubular magnetic yoke is an amorphous magnetic alloy film rolled into a tubular form, a silicon steel plate rolled into a tubular form, or a ferrite tube, and said container is made of stainless alloy.

3. A torque sensor according to claim 1, further including a tubular cushioning sleeve made from a synthetic resin and disposed between said magnetic yoke and said container, said cushioning sleeve being softer than metal and having a thickness greater than 0.05 mm.

4. A torque sensor according to claim 3, wherein said cushioning sleeve is bonded to said magnetic yoke and said container.

5. A torque sensor according to claim 3, wherein said synthetic resin constituting said cushioning sleeve is Duracon, epoxy resin, bismaleimidetriazine resin, or Teflon.

6. A torque sensor according to claim 5, wherein said tubular magnetic yoke is an amorphous magnetic alloy film rolled into a tubular form, a silicon steel plate rolled into a tubular form, or a ferrite tube, and said container is made of stainless alloy.

7. A torque sensor according to claim 1, wherein said hollow cylindrical container is loose-fitted over said magnetic yoke to have a fit tolerance about 50 μm, and said container and said magnetic yoke are joined together by a screw fastener.

8. A torque sensor according to claim 1, wherein said hollow cylindrical container and said magnetic yoke are disposed with a clearance therebetween and firmly joined together by a tubular thin film of synthetic resin filled in said clearance between said container and said magnetic yoke.

9. A torque sensor according to claim 8, wherein said synthetic resin is softer than metal and has a thickness of about 50 μm.

10. A torque sensor according to claim 8, wherein said synthetic resin is an epoxy resin.

11. A torque sensor according to claim 1, wherein said coil means is composed of a tubular bobbin made from synthetic resin and disposed around said outer peripheral surface of said shaft with a space defined therebetween, and at least one coil wound around said bobbin, said tubular magnetic yoke being firmly fitted around said bobbin to hold said coil therebetween.

12. A torque sensor comprising:
a shaft for transmitting a torque exerted thereon, at least an outer peripheral surface of said shaft being made of a magnetic alloy having a magnetostrictive property
coil means disposed around said outer peripheral surface of said shaft for detecting a magnetic property of said magnetostrictive magnetic alloy;
a tubular magnetic yoke disposed around said coil means for forming a magnetic circuit between itself and said magnetostrictive magnetic alloy;
a hollow cylindrical container disposed around said magnetic yoke for containing the same, both end portions of said hollow cylindrical container being rotatably supported by bearings with gaps between the bearings and said tubular magnetic yoke;
stepped portions formed on said shaft for supporting the bearings; and
means operatively connected with said coil means for detecting a change in magnetic permeability of said magnetostrictive magnetic alloy in terms of a change in impedance of said coil means caused by the torque exerted on said shaft, thereby determining the torque, and the torque sensor being substantially uninfluenced by a difference in thermal expansion coefficients between said tubular magnetic yoke and said hollow cylinder or by a mechanical stress created in said tubular magnetic yoke.

13. The torque sensor of claim 12, wherein said coil generates a magnetic field in a longitudinal direction of said shaft in response to current through said coil.

14. A torque sensor comprising:
a shaft for transmitting a torque exerted thereon, at least an outer peripheral surface of said shaft being made of a magnetic alloy having a magnetostrictive property;
coil means disposed around said outer peripheral surface of said shaft for detecting a magnetic property of said magnetostrictive magnetic alloy;
a tubular magnetic yoke disposed around said coil means for forming a magnetic circuit between itself and said magnetostrictive magnetic alloy;
a hollow cylindrical container disposed around said magnetic yoke for containing the same, both end portions of said hollow cylindrical container being rotatably supported by bearings with gaps between the bearings and said tubular magnetic yoke;
a cushioning member disposed between said tubular magnetic yoke and said hollow cylindrical container for absorption of stress created therebetween; and
means operatively connected with said coil means for detecting a change in magnetic permeability of said magnetostrictive magnetic alloy in terms of a change in impedance of said coil means caused by the torque exerted on said shaft, thereby determining the torque.

15. A torque sensor comprising:
a shaft for transmitting a torque exerted thereon, at least an outer peripheral surface of said shaft being made of a magnetic alloy having a magnetostrictive property;
coil means disposed around said outer peripheral surface of said shaft for detecting a magnetic property of said magnetostrictive magnetic alloy;
a tubular magnetic yoke disposed around said coil means for forming a magnetic circuit between itself and said magnetostrictive magnetic alloy;
a hollow cylindrical container disposed around said magnetic yoke for containing the same, both end portions of said hollow cylindrical container being rotatably supported by bearings with gaps between the bearings and said tubular magnetic yoke;
stepped portions formed on said shaft for supporting the bearings; and
means operatively connected with said coil means for detecting a change in magnetic permeability of said magnetostrictive magnetic alloy in terms of a change in impedance of said coil means caused by the torque exerted on said shaft, thereby determining the torque,
wherein said tubular magnetic yoke is an amorphous magnetic alloy film rolled into a tubular form, a silicon steel plate rolled into a tubular form, or a ferrite tube, and said container is made of stainless alloy.

16. A torque sensor comprising:
a shaft for transmitting a torque exerted thereon, at least an outer peripheral surface of said shaft being made of a magnetic alloy having a magnetostrictive property;
coil means disposed around said outer peripheral surface of said shaft for detecting a magnetic property of said magnetostrictive magnetic alloy;
a tubular magnetic yoke disposed around said coil means for forming a magnetic circuit between itself and said magnetostrictive magnetic alloy;
a hollow cylindrical container disposed around said magnetic yoke for containing the same, both end portions of said hollow cylindrical container being rotatably supported by bearings with gaps between the bearings and said tubular magnetic yoke;
stepped portions formed on said shaft for supporting the bearings;
a tubular cushioning sleeve made from a synthetic resin and disposed between said magnetic yoke and said container, said cushioning sleeve being softer than metal and having a thickness greater than 0.05 mm; and
means operatively connected with said coil means for detecting a change in magnetic permeability of said magnetostrictive magnetic alloy in terms of a change in impedance of said coil means caused by the torque exerted on said shaft, thereby determining the torque.

17. A torque sensor according to claim 16, wherein said cushioning sleeve is bonded to said magnetic yoke and said container.

18. A torque sensor according to claim 16, wherein said synthetic resin constituting said cushioning sleeve is Duracon, epoxy resin, bismaleimidetriazine resin, or Teflon.

19. A torque sensor according to claim 18, wherein said tubular magnetic yoke is an amorphous magnetic alloy film rolled into a tubular form, a silicon steel plate rolled into a tubular form, or a ferrite tube, and said container is made of stainless alloy.

20. A torque sensor comprising:
a shaft for transmitting a torque exerted thereon, at least an outer peripheral surface of said shaft being made of a magnetic alloy having a magnetostrictive property;
coil means disposed around said outer peripheral surface of said shaft for detecting a magnetic property of said magnetostrictive magnetic alloy;
a tubular magnetic yoke disposed around said coil means for forming a magnetic circuit between itself and said magnetostrictive magnetic alloy;
a hollow cylindrical container disposed around said magnetic yoke for containing the same, both end portions of said hollow cylindrical container being rotatably supported by bearings with gaps between the bearings and said tubular magnetic yoke;
stepped portions formed on said shaft for supporting the bearings; and
means operatively connected with said coil means for detecting a change in magnetic permeability of said magnetostrictive magnetic alloy in terms of a change in impedance of said coil means caused by the torque exerted on said shaft, thereby determining the torque,
wherein said hollow cylindrical container is loose-fitted over said magnetic yoke to have a fit tolerance about 50 μm, and said container and magnetic yoke are joined together by a screw fastener.

21. A torque sensor comprising:
a shaft for transmitting a torque exerted thereon, at least an outer peripheral surface of said shaft being made of a magnetic alloy having a magnetostrictive property;
coil means disposed around said outer peripheral surface of said shaft for detecting a magnetic property of said magnetostrictive magnetic alloy;
a tubular magnetic yoke disposed around said coil means for forming a magnetic circuit between itself and said magnetostrictive magnetic alloy;
a hollow cylindrical container disposed around said magnetic yoke for containing the same, both end portions of said hollow cylindrical container being rotatably supported by bearings with gaps between the bearings and said tubular magnetic yoke;
stepped portions formed on said shaft for supporting the bearings; and
means operatively connected with said coil means for detecting a change in magnetic permeability of said magnetostrictive magnetic alloy in terms of a change in impedance of said coil means caused by the torque exerted on said shaft, thereby determining the torque,
wherein said hollow cylindrical container and said magnetic yoke are disposed with a clearance therebetween and firmly joined together by a tubular thin film of synthetic resin filled in said clearance between said container and said magnetic yoke.

22. A torque sensor according to claim 21, wherein said synthetic resin is softer than metal and has a thickness of about 50 μm.

23. A torque sensor according to claim 21, wherein said synthetic resin is an epoxy resin.

24. A torque sensor comprising:
a shaft for transmitting a torque exerted thereon, at least an outer peripheral surface of said shaft being made of a magnetic alloy having a magnetostrictive property;
coil means disposed around said outer peripheral surface of said shaft for detecting a magnetic property of said magnetostrictive magnetic alloy;
a tubular magnetic yoke disposed around said coil means for forming a magnetic circuit between itself and said magnetostrictive magnetic alloy;
a hollow cylindrical container disposed around said magnetic yoke for containing the same, both end portions of said hollow cylindrical container being rotatably supported by bearings with gaps between the bearings and said tubular magnetic yoke;
stepped portions formed on said shaft for supporting the bearings; and
means operatively connected with said coil means for detecting a change in magnetic permeability of said magnetostrictive magnetic alloy in terms of a change in impedance of said coil means caused by the torque exerted on said shaft, thereby determining the torque,
wherein said coil means is composed of a tubular bobbin made from synthetic resin and disposed around said outer peripheral surface of said shaft with a space defined therebetween, and at least one coil wound around said bobbin, said tubular magnetic yoke being firmly fitted around said bobbin to hold said coil therebetween.

* * * * *